United States Patent [19]

Tabuchi et al.

[11] Patent Number: 5,136,437
[45] Date of Patent: Aug. 4, 1992

[54] VIDEO SIGNAL RECORDING/REPRODUCING DEVICE

[75] Inventors: Toshiaki Tabuchi, Nara; Kyoji Kasuga, Tenri, both of Japan

[73] Assignee: Sharp Kabushiki Kaisha, Osaka, Japan

[21] Appl. No.: 454,892

[22] Filed: Dec. 22, 1989

[30] Foreign Application Priority Data

Dec. 27, 1988 [JP] Japan ................... 63-330953
Dec. 27, 1988 [JP] Japan ................... 63-330954

[51] Int. Cl.⁵ ................................. G11B 15/14
[52] U.S. Cl. .............................. 360/64; 360/34.1
[58] Field of Search ............ 360/64, 70, 34.1, 35.1

[56] References Cited

U.S. PATENT DOCUMENTS 4,486,792 12/1984 Edakubo et al.
4,743,977  5/1988 Yoshioka et al.
4,743,978  5/1988 Tanaka.
4,905,104  2/1990 Okamoro et al. ................ 360/64

FOREIGN PATENT DOCUMENTS

3702333A1 8/1988 Fed. Rep. of Germany.

OTHER PUBLICATIONS

"A Two-Channel Recording VCR Using Orthogonal Arrangement of Heads", Y. Nagaoka et al., IEEE Transactions on Consumer Electronics, vol. 35, No. 3, Aug. 1989, pp. 202-206.

"Wideband Recording Technology for High-Definition Baseband VCRs", by Masami Itoga et al., Mitsubishi Electric Corp., Kyoto, Japan, pp. 203-209.0.

Primary Examiner—Vincent P. Canney

[57] ABSTRACT

A video signal recording/reproducing apparatus with two groups of rotary heads which respectively include one main head and two auxiliary heads is set forth. The apparatus includes a head switching device for switching one of the two auxiliary heads into operation according to input video signals and a tape speed switching device for switching the running speed of a video tape according to the input video signals. The apparatus permits the video signal recording/reproducing of both video signals having a wide band and a narrow band. The apparatus also defines an effective tape wrap angle wherein the position of head switching is removed from a screen so that the division of images within the screen is avoidable and so that noise bars produced in the boarders of these images do not appear even in the case of special reproduction. The apparatus further permits recording of video signals on a video tape while approximately conforming a line number in the center of the main tracks to that in the center of the effective lines of the TV image. Accordingly, noise bars produced by head switching and image parts with less information amount can be removed by separating and locating them out of the upper and lower ends of the screen.

15 Claims, 9 Drawing Sheets

DIRECTION OF DRUM ROTATION

DIRECTION OF DRUM ROTATION

DIRECTION OF TAPE RUN

VIDEO SIGNAL RECORDING/REPRODUCING DEVICE

FIELD OF THE INVENTION

The present invention relates to a video signal recording/reproducing device wherein both base band signals and MUSE signals can be recorded or reproduced for use in, for example, HD-TV's and wherein one field is divided into plurality of segments so as to be recorded in respective different tracks.

BACKGROUND OF THE INVENTION

DESCRIPTION OF THE BACKGROUND ART

One of the most popular methods for obtaining high resolution images for television screen images is the HD-TV (high-definition television) method. On the other hand, as to a method for performing band compression in order to transmit video signals for this HD-TV, the MUSE(multiple sub-Nyquist sampling encoding) method has been developed. Moreover, nowadays several VTR's(video tape recorders) for recording these baseband signals and MUSE signals for HD-TV have already been suggested.

One of the VTR's suggested for recording baseband signals for HD-TV's is considered, for example, in Wideband Recording Technology for High-Definition Baseband VCRS, 1987 IEEE Vol. CE-33, No. 3).

In this VTR, in order to perform recording or reproducing of video signals having band limitations of 20 MHz for a brightness signal and 5 MHz for a color signal, the speed of rotation of the rotary drum is increased to 5400 rpm, which is three times that of conventional household VTR's. A segment recording method is also adopted, wherein one field is divided into three segments so as to be recorded in respective different tracks. Moreover, each of these divided tracks is divided into two parts for two-channel recording, thereby permitting a recording frequency to have a narrow band.

Compared with the above-mentioned baseband signal, a Muse signal can be compressed into about half of that size the above that so that a VTR is suggested, wherein the rotation speed of a rotary drum is twice that of conventional household VTR's. Furthermore, and one field is divided into two segments for performing one-channel recording. Accordingly, the VTR employing the MUSE signal is able to perform a longer recording than that employing the baseband signal.

However, some of these VTR's for recording baseband signals from HD-TV and the others for recording MUSE signals have been separately developed as different devices only aiming at use with the respective video signals. Conventionally, the VTR for recording baseband signals, which has a shorter a recording time, is therefore used in order to obtain high resolution images. On the other hand, the VTR used only for recording MUSE signals intended for satellite broadcast, which has a longer recording time. In this way, users have to select from among one of these VTR's depending on whether they want recorded images of high resolution or longer available recording time regardless of image quality. More specifically, they have been unable to perform long recording or reproducing with high resolution images in a single device. This problem is common wherein a selection can be made between video signals having a wide band and those having a narrow band.

Hereupon, the following description deals with a conventional video signal recording/reproducing device according to FIGS. 14 to 17.

As is shown in FIG. 14, there are four magnetic heads 22 secured to a rotary drum 21, forming two pairs. Each pair of magnetic heads 22 is located on the rotary drum 21 in an opposite position from each other with a 180° interval. A video tape 23 supplied through a feeding side guide pole 24 and a winding side guide pole 25 is helically wrapped onto the rotary drum 21 at an angle of more than 180°.

The above-mentioned rotary drum 21 rotates at high speed, 3600 rpm, in order to increase relative speed between the magnetic heads 22 and the video tape 23. This is because baseband signals for HD-TV need a band of more than 20 MHz. Moreover, baseband signals having a wide band are recorded using a so-called two-channel, two-segment method by the four magnetic heads 22 located on the rotary drum 21, thereby permitting the magnetic heads 22 to have a narrow band as their recording band. More specifically, at first one field portion of a baseband signal is divided into two segments, and they are distributed to the respective pairs of magnetic heads 22 located at a 180° interval. Next, each of the segments distributed is divided again into two channels, and simultaneously recorded respectively as two tracks by each pair of two magnetic heads 22.

Accordingly, as shown in FIG. 15, on the video tape 23, two tracks 26 corresponding to one segment are simultaneously formed every half a rotation of the rotary drum 21. Then, the total of four tracks 26 corresponding to two segments formed by one rotation of the rotary drum 21 compose one field, and the tracks 26 of two fields, each field including four tracks, compose one frame of baseband signal recording.

On the other hand, in a recording method wherein one field isn't divided into segments, the occurrence of noise bars on the screen can be prevented by performing the head switching of the magnetic heads in vertical blanking parts.

However, in the segment recording method, as described above, head switching among segments has to be performed not only in the vertical blanking parts but also in the screen.

Hereupon, the following description deals with a noise bar prevention processing method by using head switching with respect to conventional video signal recording/reproducing devices, according to FIG. 16. The left drawing in FIG. 16 shows one field portion of a baseband signal, and the right drawing shows a recorded signal of the baseband signal. These figures respectively represent one field portion of a baseband signal with its horizontal scanning period shown in the x-axis, and its vertical scanning period in the y-axis.

Besides an image part 27, in the one field portion of the baseband signal is contained a vertical blanking part 28 which has no relation to the images. Since the head switching between fields i performed in this vertical blanking part 28, conventionally there are no noise bars produced in the screen due to the head switching. However, since the head switching between segments has to be performed in a segment boarder 29 within the image part 27, as shown in the drawing on the left, there are noise bars produced within the above-mentioned image part 27 if no treatment is given.

In this relation, conventionally, the vertical blanking part 28 of the baseband signal is divided into two regions, vertical blanking parts 28a as well as 28b, as is shown in the drawing on the right. A signal wherein one of the vertical blanking part 28a is inserted into the segment boarder 29 located in the center of the image part 27 is used as a recording signal. In this case, by performing the head switching between segments in the vertical blanking part 28a inserted there into, the occurrence of noise bars in each segment of the image parts 27a and 27b is preventable. In this case, however, it is necessary to record the image part 27b with a delay of time T, and this process is performed in the circuit. In reproducing, it is necessary to compose the image parts 27a and 27b together by following the reverse operation.

As a result, in a normal reproduction, a correct image can be obtained on a screen 30 without noise bars, as is shown in FIG. 17(a).

However, in the segment recording method, in a special reproduction, the occurrence of divided images or the occurrence of noise bars on the screen 30 are not preventable. More specifically, when, for example, speed reproduction three times that of normal reproduction is executed in the segment recording method, an image on the screen 30 is divided into two upper and lower parts because magnetic heads 22 can not follow the one track. Moreover, in a special reproduction, the position of noise bars tends to move off the vertical blanking part 28a due to electrical malfunctions in the head switching synchronization because of the instability of the tape run or the like. As a result, as shown in FIG. 17(b), sometimes the image is not only divided into two parts on the screen 30 but also has noise bars 31 due to the head switching occurring in the boarder part between the two separated parts. This problem is common to a device employing the segment recording method, whether it is a video signal recording/reproducing device for HD-TV or not.

Accordingly, in the conventional video signal recording/reproducing device, there is a problem in that in a special reproduction, images are divided and also have noise bars near the boarders of the divided parts, and therefore the quality of those images deteriorates.

In this relation, for example, by using DTF(dynamic tracking following) technique wherein a piezo-electric device is employed to displace the magnetic head for the off-track portion, the scan can be performed following the one track and the division of images is preventable even in a special reproduction. However, the system is very complicated and delicate in mechanical structure as well as in control composition and its cost is very high, so in reality it is difficult to apply the DTF technique to video signal recording/reproducing devices for general use. Moreover, even if the DTF technique is adopted, the occurrence of noise bars due to the head switching between segments is not preventable, and therefore the deterioration of image quality is not completely avoidable.

SUMMARY OF THE INVENTION

It is an object of the present invention to record and reproduce both wide band and narrow band video signals through use of only one device.

It is another object of the present invention is to prevent the occurrence of noise bars produced by head switching on an actual screen, wherein overscanning is taken into consideration, to the outside thereof.

It is still another object of the present invention to bring the center of images to be considered important to the center of a screen.

In order to achieve the above objects, the present invention is drawn to an apparatus including rotary heads which is comprised of at least one group of heads consisting of one main head and two auxiliary heads, a head switching device for switching the above two auxiliary heads according to video signals entered therein, and a tape speed switching device for switching the running speed of a video tape according to the video signals entered therein. According to the video signals, one of the above auxiliary heads is switched by the head switching device and the running speed of the tape is switched by the tape speed switching device, and thereby the apparatus permits a video signal recording/reproducing device to record and reproduce both video signals having a wide band and a narrow band by the use of only one device.

In accordance with the above apparatus video signals having a wide band are recorded in two channels. Furthermore, video signals having a narrow band are recorded in one channel by the use of the same device.

In order to achieve the above objects, the present invention is characterized in that by wrapping tape onto a rotary drum at an angle $\Theta_V$(effective tape wrap angle), which satisfies the requirements of the following formula, wherein $L_V$ represents the number of TV receiver effective lines, $L_R$ the number of effective recording lines, and K the overscanning rate of a TV receiver:

$$\Theta_V \geq (1 - K) \times \frac{L_V}{L_R} \times 360°$$

the occurrence of noise bars produced by performing head switching from the main head to the auxiliary head can be prevented on the actual screen, wherein the overscanning is taken into consideration. Accordingly, even in a special reproduction, since the position of head switching is removed from the image part of the field, the division of images within the screen is avoidable and therefore noise bars produced at the boarders of these images do not appear within the screen.

Moreover, in order to achieve the above objects, the present invention is also characterized in comprising a signal processing means whereby recordings are made on a video tape with the central line number of the main tracks approximately conformed to that of the TV receiver effective lines. In this way, the center of the screen is conformed to that of an effective image area. Noise bars produced by head switching together with image parts with less information amount can be removed by separating and locating them out of the upper and lower ends of the screen.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIGS. 1 to 5 illustrate a first preferred embodiment of the present invention wherein.

FIG. 1 is a block diagram illustrating the control part of a video signal recording/reproducing device;

FIG. 2 is a plan view of a rotary drum;

FIG. 3 is an illustration of the configuration of the magnetic heads;

FIG. 4 is a front view of a video tape illustrating track patterns formed by the magnetic heads;

FIGS. 6 to 13 illustrated a further preferred embodiment of the present invention wherein.

FIG. 6 is a plan view of a rotary drum;

FIG. 7 is a front view of a video tape showing track patterns formed by magnetic heads;

FIG. 9 is a diagram showing a configuration between a screen and a line array;

FIG. 11 shows a relation between a screen and a line array;

FIGS. 12 to 13 illustrate operations of the present invention wherein.

FIG. 12 is a diagram showing respective image areas on a screen;

FIG. 13 is a diagram showing relations between respective image areas and recording areas;

FIGS. 14 to 17 illustrate background art wherein.

FIG. 14 shows a plan view of a rotary drum;

FIG. 15 is a front view of a video tape showing track patterns formed by magnetic heads;

FIG. 16 is a diagram showing a configuration between image areas on a screen and recording areas.

DESCRIPTION OF THE EMBODIMENTS

One way of carrying out the invention is described in detail in a first embodiment with reference to FIGS. 1 to 5 as follows.

This embodiment relates to a video signal recording/reproducing device for recording and reproducing baseband signals for HD-TV as well as MUSE signals by adopting a 1.5 head method. The above mentioned 1.5 head method relates to a method wherein main tracks as well as auxiliary tracks are formed on a video tape using a so-called main head and auxiliary heads, wherein and one field portion of a video signal is helically recorded every one rotation of a rotary drum.

Baseband signals for HD-TV require a band wider than 20 MHz for obtaining high quality images. The band is five times as wide as that required for video signals used in the present NTSC method. Accordingly, in order to record such baseband signals, the relative speed between the magnetic heads and a video tape should be two to three times as fast as that required for the conventional household VTR's, and the rotation speed of a rotary drum should be 3600 rpm to 7200 rpm so as to widen the band. Moreover, a track should be divided to permit two-channel recording, and therefore a recording band of each track should be narrowed down to half the size. For example, supposing a band of a baseband signal is 24 MHz, after processing the band to have two channels, the band has 12 MHz per one channel. Furthermore, generally the recording method of VTR's is FM modulation, and its central carrier frequency is 18 MHz. Assuming that the frequency deviation is ±2 MHz, in this case, the recording band is 16 MHz to 20 MHz.

In MUSE signals, the required band is narrowed down to half the size by performing band compression on the above baseband signal. Accordingly, in order to record this MUSE signal, it is only necessary to have a recording band of one channel portion in comparison with two channels in the case of the above baseband signal. As is described above, in order to record video signals for HD-TV's, two-channel recording is required for baseband signals, and on the other hand one-channel recording is required for MUSE signals.

Figure 2:
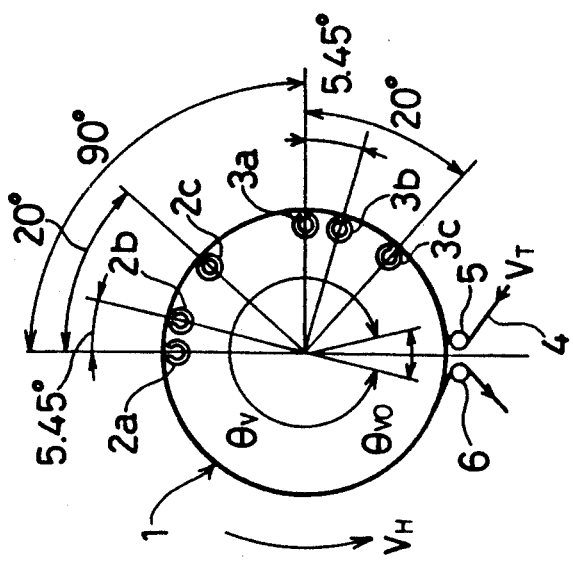
Figure 3:
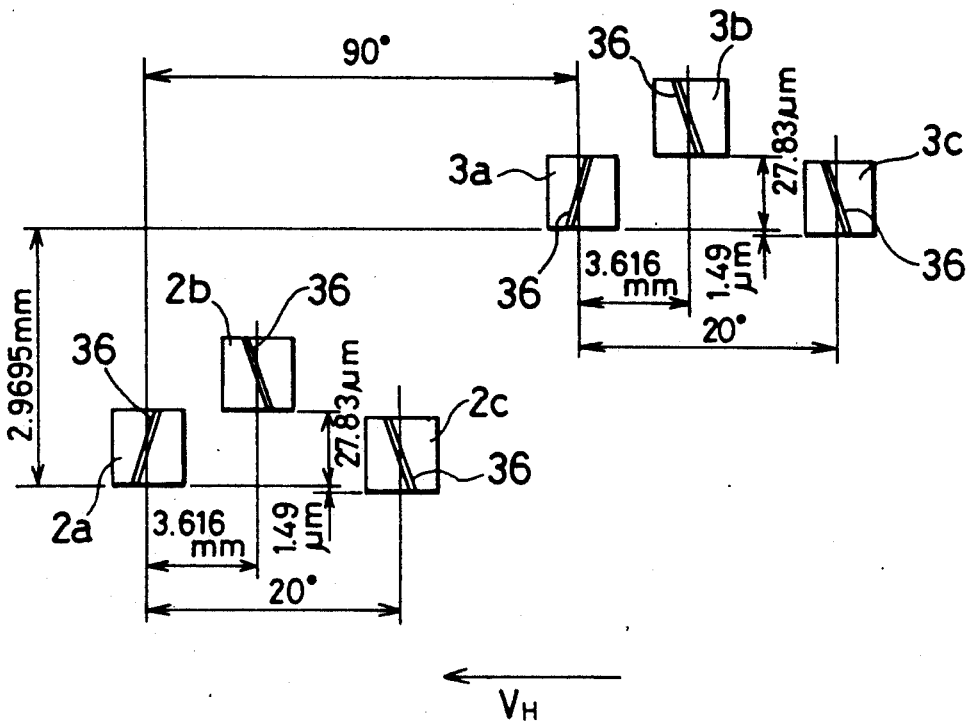

FIG. 2 as well as FIG. 3 shows the configuration of magnetic heads 2 and 3 on a rotary drum 1 in accordance with a video signal recording/reproducing device of the embodiment. As shown in FIG. 2, a magnetic head 2b is located to the rear of the magnetic head 2a with an angle of 5.45° with respect to the direction of the rotation of a rotary drum 1 and a magnetic head c is also located to the rear with an angle of 20°. A magnetic head 3a is located to the rear of the magnetic head 2a with an angle of 90° with respect to the direction of the rotation of the rotary drum 1. A magnetic head 3b is located to the rear of magnetic head 3a with an angle of 5.45°, and a magnetic head 3c is also located to the rear with an angle of 20°. In addition, the rotary drum 1 is a drum, for example with a diameter 76 mm, which revolves at a speed of $V_H$ 3600 rpm as driven by a motor(-not shown).

Moreover, as shown in FIG. 3, the magnetic head 2b is located a relative distance 27.83 μm upward with respect to the magnetic head 2a on the rotary drum 1, and the magnetic head 2c is located a relative distance of 1.49 μm downward with respect to the magnetic head 2a on the rotary drum 1. The magnetic head 3a is located a relative distance of 2.9695 mm upward with respect to the magnetic head 2a. The magnetic head 3b is located a relative distance of 27.83 μm upward with respect to the magnetic head 3a, and the magnetic head 3c is located a relative distance of 1.49 μm downward the magnetic head 2a.

Furthermore, assuming that an azimuth angle of a magnetic gap 36 on the magnetic head 2a is positive the azimuth angle of the magnetic gap 36 on the respective magnetic heads 2b and 2c, is for example set as negative in a reverse orientation. Assuming that the azimuth angle of the magnetic gap 36 on the magnetic head 3a is positive, the azimuth angle of the magnetic gap 36 of the respective magnetic heads 3b and 3c, is for example set as negative in a reverse orientation.

The above magnetic heads, 2a to 2c, compose a group of magnetic heads for forming main tracks 7 in the 1.5 head method (described later). On the other hand, the magnetic heads, 3a to 3c, compose another group of magnetic heads for forming auxiliary tracks 8 in the 1.5 head method (described later). The magnetic heads 2 as well as 3 are preferably arranged as closely to one another as possible in each group, which preferably forms a group of integrated type.

On the rotary drum 1 wherein magnetic heads 2 as well as 3 are located in the above configuration, a video tape 4 is helically wrapped as is shown in FIG. 2. The video tape 4 runs in the same direction as the rotary drum 1. Moreover, the video tape 4 is guided along the rotary drum 1 by a feeding side guide pole 4 and a winding side guide pole 6, and is wrapped thereon so that it has, for example an angle of 312° to the rotary drum 1 as an effective tape wrap angle, $\Theta_V$.

Figure 4:
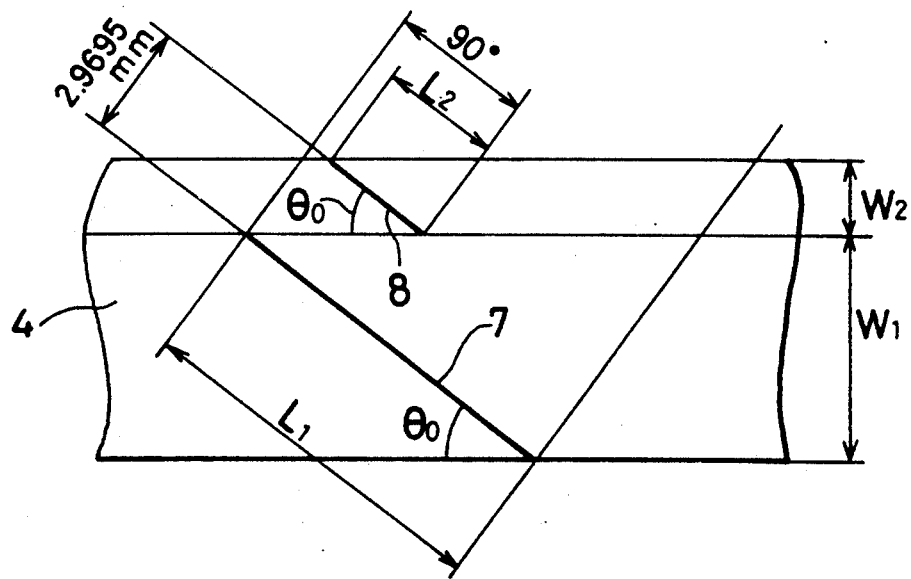

On the above video tape 4, a main track 7(drawn with a solid line in the drawing for convenience) is formed by the magnetic heads 2 as is shown in FIG. 4, and a auxiliary track 8(drawn with a solid line for convenience) is formed by the magnetic head 3. Hereupon, the main track 7 with respect to the video tape 4 as well as a track lead angle $\Theta_o$ with respect to the auxiliary track 8 satisfies the requirements of the following formula (1), $$\Theta_o = \sin^{-1}(W_1/L_1) = \sin^{-1}(W_2/L_2) \quad (1)$$

where $L_1$ and $L_2$ represent the respective recording lengths of the main track 7 and the auxiliary track 8, and $W_1$ and $W_2$ represent the respective tape effective recording widths of these tracks.

Moreover, the recording lengths $L_1$ and $L_2$ of the main track 7 and the auxiliary track 8 depend on the tape wrap angle of the video tape 4 to the rotary drum 1, and are respectively expressed by the following formulas, (2) and (3).

$$L_1 = \pi \cdot D(\Theta_V/360°) \quad (2)$$

$$L_2 = \pi \cdot D(\Theta_{VO}/360°) \quad (3)$$

where D represents the diameter of the rotary drum 1, and the effective tape wrap angle is 312° as is mentioned before. (An auxiliary tape wrap angle, $\Theta_{VO}$ is 48° in this case.)

As the result of the above, a recording all around the circumference of the rotary drum I ca be performed by the main tracks 7 and the auxiliary tracks 8, and one field portion of video signals is recorded or reproduced while the rotary drum 1 makes one rotation. Accordingly, when the rotary drum 1 makes two rotations, one frame portion of video signals is recorded or reproduced.

Figure 1:
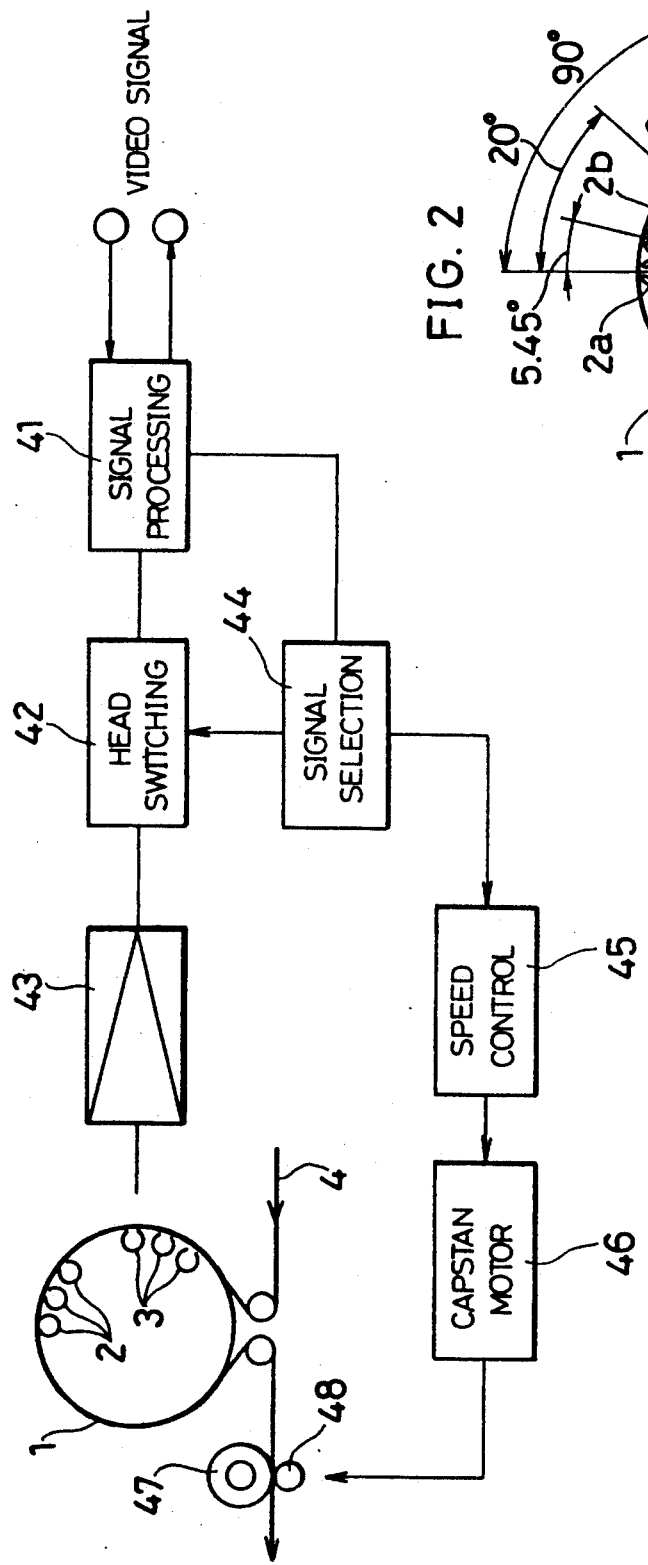

The following description deals with the structure of a control part for controlling the magnetic heads 2 as well as 3 and the video tape 4 according to FIG. 1.

Video signals are entered to a signal processing circuit 41 and recorded therein, and they are also released from the signal processing circuit 41 and are reproduced. More specifically, the signal processing circuit 41 is a circuit which converts video signals from analog to digital, and processes them by adding synchronous signals or the like. The signal processing circuit 41 is connected to the magnetic heads 2 as well as 3 secured to the rotary drum 1 through a head switching circuit 42 and a head amplifier 43. For example, during recording, video signals processed in the signal processing circuit 41 are sent to the magnetic head 2 as well as 3 secured to the rotary drum 1 through the head switching circuit 42 and the head amplifier 43. On the other hand, during reproducing, video signals reproduced by the magnetic heads 2 as well as 3 are sent to the signal processing circuit 41 through the head amplifier 43 and the head switching circuit 42.

The head switching circuit 42 is a circuit which switches the magnetic heads between heads 2b and 2c of the magnetic heads 2, and also switches between heads 3b and 3c of the magnetic heads 3. For example, when a combination of the magnetic heads, 2a and 2b as well as 3a and 3b, is selected by the head switching circuit 42, video signals divided into two channels are on the one hand simultaneously sent to the respective magnetic heads, 2a and 2b, and on the other hand simultaneously sent to the respective magnetic heads, 3a and 3b. Similarly, when a combination of the magnetic heads, 2a and 2c as well as 3a and 3c, is selected by the head switching circuit 42, video signals of one channel are on the one hand alternately sent to the magnetic heads 2a or the magnetic head 2c every one rotation of the rotary drum 1, and are on the other hand alternately sent to the magnetic head 3a or the magnetic head 3c. The above operation is similarly performed in reproducing. The head amplifier 43 is a circuit which amplifies video signals and controls the signals to obtain the most appropriate current.

Video signals from the signal processing circuit 41 are also sent to a signal selection circuit 44. The signal selection circuit 44 identifies whether those video signals are baseband signals or MUSE signals, and releases signals to the head switching circuit 42 and a speed control circuit 45 according to the result of the identification. In addition, this signal selection circuit 44 can be optionally composed of hardware such as a switch for switching between baseband signals and MUSE signals by manual operation. The head switching circuit 42 performs the above switching actions according to the signals from the signal selection circuit 44.

The speed control circuit 45 is a circuit for controlling running speeds of the video tape 4 according to the signals from the signal selection circuit 44. The output of the speed control circuit 45 is connected to a capstan motor 46. The capstan motor 46 drives a capstan 48, and permits the video tape 4 to run at a fixed speed by the use of the capstan 48 as well as a pinch roller 47.

The following description deals with operations of a video signal recording/reproducing device having the above composition according to FIG. 5.

In recording or reproducing video signals, the signal selection circuit 44 identifies whether they are baseband signals or MUSE signals. Then, according to the result of the identification, the head switching circuit 42 performs head switching between magnetic heads 2 and 3, and the speed control circuit 45 controls the running speeds of the video tape 4.

Figure 5A:
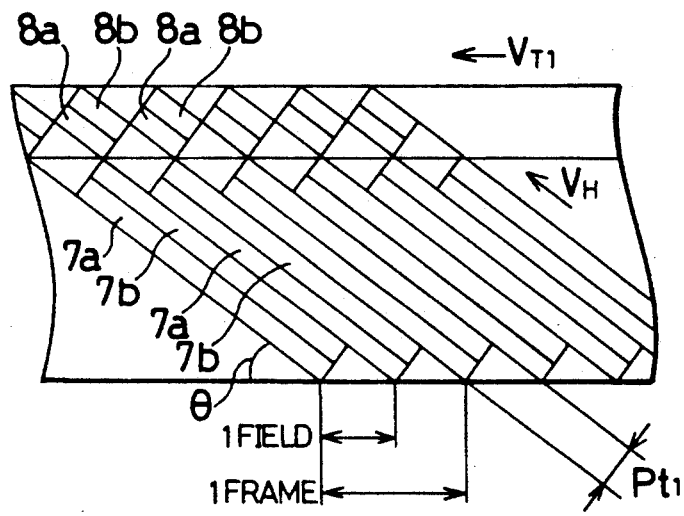
FIG. 5(a) is a front view of a video tape showing track patterns in recording baseband signals.

For example, if the video signals are baseband signals(video signals having a wide band), the magnetic heads, 2a and 2b, as well as the magnetic heads, 3a and 3b are selected by the head switching circuit 42, and the running speed of the video tape 4 is increased to be high by the speed control circuit 45. In this case, track patterns as shown in FIG. 5(a) are formed on the video tape 4. More specifically, main tracks 7a and 7b, which are located adjacent each other, are simultaneously formed by respective magnetic heads, 2a and 2b. Auxiliary tracks, 8a and 8b, which are located adjacent each other, are also simultaneously formed by the respective magnetic heads, 3a and 3b. In this way, while the rotary drum 1 makes one rotation, one field is formed including the two main tracks, 7a and 7b, and the two auxiliary tracks, 8a and 8b, respectively, so the recording method is expressed as a two-channel recording method. Moreover, these magnetic heads, 2a and 2b, as well as 3a and 3b, have each magnetic gap 36 reversed in its azimuth angle with respect to each other, guard bandless recordings of the main tracks, 7a and 7b, as well as the auxiliary tracks, 8a and 8b, can be performed, and therefore effective use of the video tape 4 can be made.

Figure 5B:
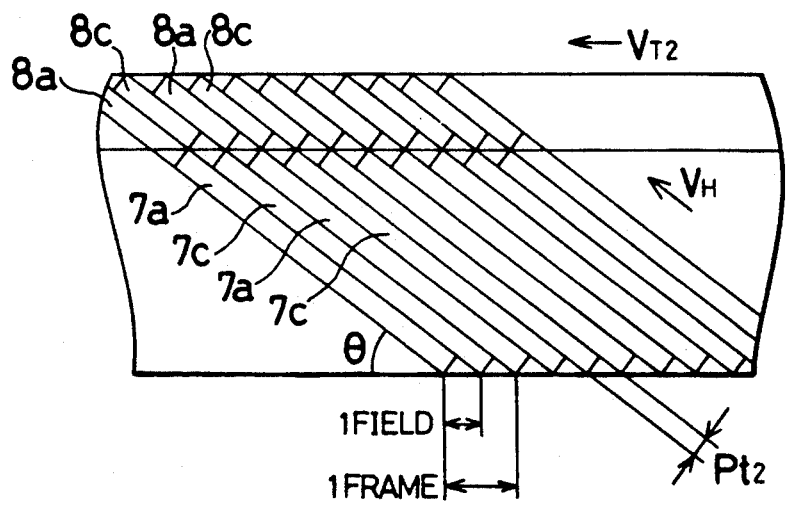
FIG. 5(b) is a front view of a video tape showing track patterns in recording MUSE signals.

On the other hand, if the video signals are MUSE signals(signals having a narrow band), the magnetic heads, 2a and 2c, as well as 3a and 3c, are selected by the head switching circuit 42, and the running speed of the video tape 4 is decreased to be low by the speed control circuit 45. In this case, track patterns as shown in FIG. 5(b) are formed on the video tape 4. More specifically, after a main track 7a is formed by the magnetic head 2a, a main track 7c adjacent the above track is formed by the magnetic head 2c through the next rotation of the rotary drum 1. Moreover, after an auxiliary track 8a is formed by a magnetic head 2a, an auxiliary track 8c adjacent the above track is formed by the magnetic head 3c through the next rotation of the rotary drum 1. In this way, since one field is formed of the main track 7a and the auxiliary track 8a, or of the main track 7c and the auxiliary track 8c, the recording method is also expressed as a one channel recording method. Moreover, these magnetic heads, 2a and 2c, as well as 3a and 3c, each have magnetic gap 36 reversed in its azimuth angle with respect to each other. Furthermore, guard bandless recordings of the main tracks, 7a and 7c, as well as the auxiliary tracks, 8a and 8c, can be performed and therefore, effective use of the video tape 4 can be made.

In addition, since the magnetic head 2c selected in recording MUSE signals is located at a position 20° behind that of the magnetic head 2a in the direction of the rotary drum 1, the main track 7c has a delay of 20° to the main track 7a in a signal phase point of view. Accordingly, in the case of MUSE signals, video signals should be delayed by the use of a line memory or other memory elements in order to adjust this delay.

Hereupon, Table 1 shows respective specifications for both of the cases, the above baseband signals and MUSE signals. In the table, track patterns in both of the cases are supposed to have the H alignment. ($a_H = 1.5$)

TABLE 1

|  | Baseband Signals | MUSE Signals |
|---|---|---|
| Track Pitch Pt | 57.4 μm | 26.8 μm |
| Tape Running Speed $V_r$ | 81.4 mm/s | 38.1 mm/s |
| Track Lead Angle Θ | 2.4238° | 2.416° |
| Track Lead Angle $Θ_o$ | 2.41° | 2.41° |
| Effective Tape Roll Angle $Θ_V$ | 312° | 312° |

As is mentioned in the above, the video signal recording/reproducing device in accordance with the present invention permits on the one hand to record video signals having a wide band without the deterioration of image quality by the use of two channel recording, and on the other hand to record video signals having a narrow band by the use of one channel recording in order to achieve a long period recording. Moreover, in recording PCM audio signals as well as video signals, four channel recording can be performed by quantizing the signals in sixteen bits in the case of baseband signals, and in the case of MUSE signals, the same can be performed by quantizing the signals in eight bits.

Moreover, in the present embodiment, a video signal recording/reproducing device using a so-called 1.5 head method is considered however it is possible to use another method to achieve the present invention. Furthermore, the diameter of the drum or the dimensions of head installing positions are not limited to the above. Similarly, the present invention is adoptable not only in HD-TV's but also in the other systems wherein video signals are selectable between those having a wide band and a narrow band.

Another way of carrying out the invention is described in detail with reference to FIGS. 6 to 13 as follows. As a matter of convenience, the same reference numerals are given to members which have the same functions as above, and the detailed descriptions are omitted.

This embodiment relates to a video signal recording/reproducing device for recording and reproducing baseband signals for HD-TV's by the use of the above 1.5 head method.

Figure 6:
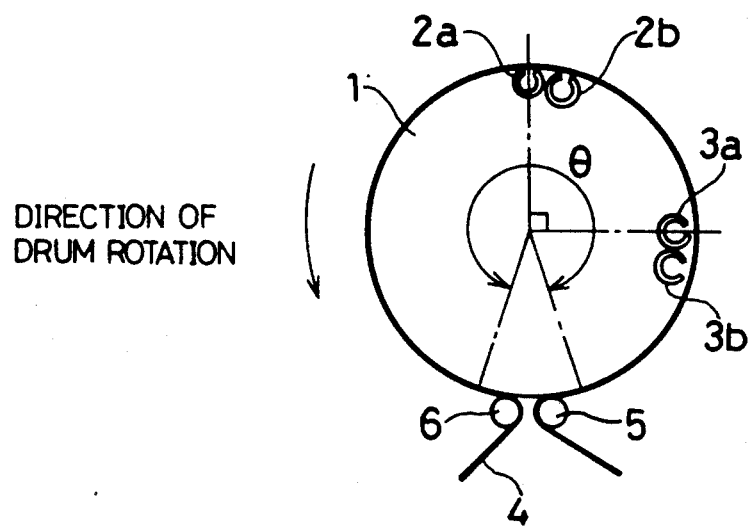

As shown in FIG. 6, on the rotary drum 1 there are located a pair of main heads 2a and 2b as well as a pair of auxiliary heads 3a and 3b at an interval of 90° having a fixed positional level difference. A video tape 4 supplied through a feeding side guide pole 5 and a winding side guide pole 6 is helically wrapped onto the rotary drum 1. Moreover, the video tape 4 is wrapped onto the rotary drum 1 so that it has an effective tape wrap angle $Θ_V$ of more than 312° (as will be described in detail later). In addition, as to the relative relationship between the main heads 2 and the auxiliary heads 3, an angle difference of $(360° - Θ_V)$ is acceptable in a two dimensional point of view, but the above-mentioned 90° angle difference is adopted as an example so as to take the balance of installment into consideration in this embodiment.

The above rotary drum 1 revolves at a high speed of 3600 rpm in order to increase a relative speed between the magnetic heads 2, 3 and the video tape 4 because a band having more than 20 MHz is required for the baseband signals of HD-TV's.

The present embodiment is similar to conventional systems in that baseband signals having a wide band are recorded in a so-called two-channel, two-segment recording method by the use of four magnetic heads 2 and 3 on the rotary drum 1 in order to permit a recording frequency of the respective magnetic heads 2 and 3 to have a narrow band. However, in the present embodiment, the above-mentioned 1.5 heads method using the main head 2a and 2b as well as the auxiliary heads 3a and 3b is adopted to make recordings.

Figure 7:
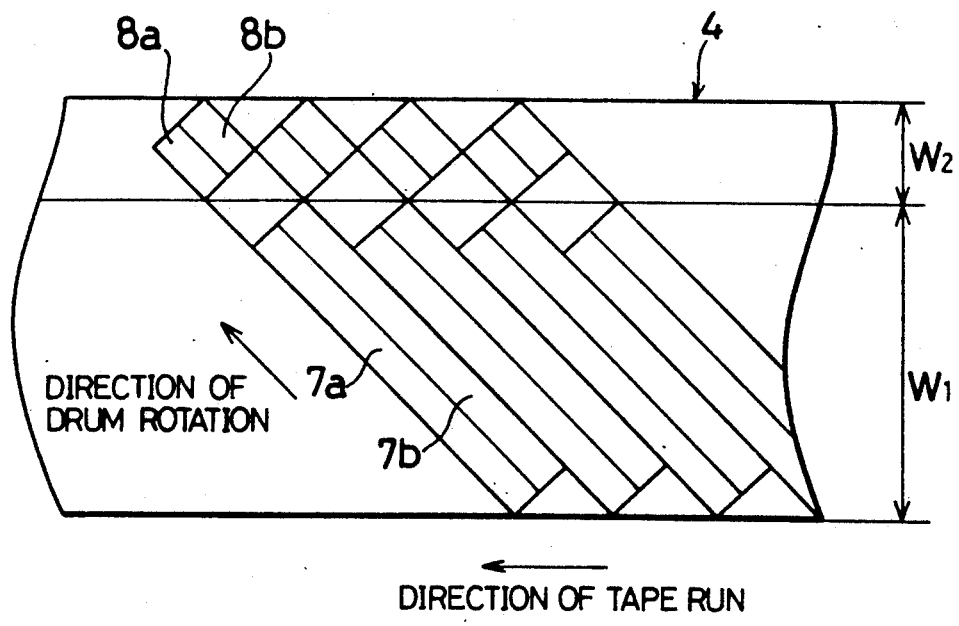

More specifically, as shown in FIG. 7, the video tape 4 is divided into two areas in the direction of its width. Then, in a main track area having a wider effective recording width $W_1$, are simultaneously formed two main tracks 7a and 7b by the main heads 2a and 2b, and in an auxiliary track area having a narrower effective recording width $W_2$, are simultaneously formed two auxiliary tracks 8a and 8b by the auxiliary heads 3a and 3b.

Accordingly, a baseband signal has its one field portion divided into two segments, a wider and a narrower one, and each segment is distributed to the corresponding main heads 2 or auxiliary heads 3. Then, each segment distributed is divided into two channels, and is recorded in the respective main tracks 7a and 7b or in the respective auxiliary tracks 8a and 8b by the two main heads 2a and 2b or by the two auxiliary heads 3a and 3b. As a result, on the video tape 4, two main tracks 7a and 7b as well as two auxiliary tracks 8a and 8b are formed every one rotation of the rotary drum 1, which make one field portion, and therefore one frame portion of a baseband signal is recorded every two rotations of the rotary drum 1.

Moreover, recording lengths $L_1$ and $L_2$ of the respective main tracks 7 and auxiliary tracks 8 depend on the tape wrap angle of the video tape 4 to the rotary drum 1, and are expressed by the above-mentioned formulas, (2) and (3), and the effective tape wrap angle $\Theta_V$ is more than 312° as is above-mentioned. The track lead angle $\Theta_0$ of the main tracks 7 as well as the auxiliary tracks 8 to the video tape 4 is expressed by the above-mentioned formula (1).

Hereupon, an explanation is given as to why the effective tape wrap angle of approximately more than 312° is necessary as follows according to FIGS. 12 and 13.

Figure 12:
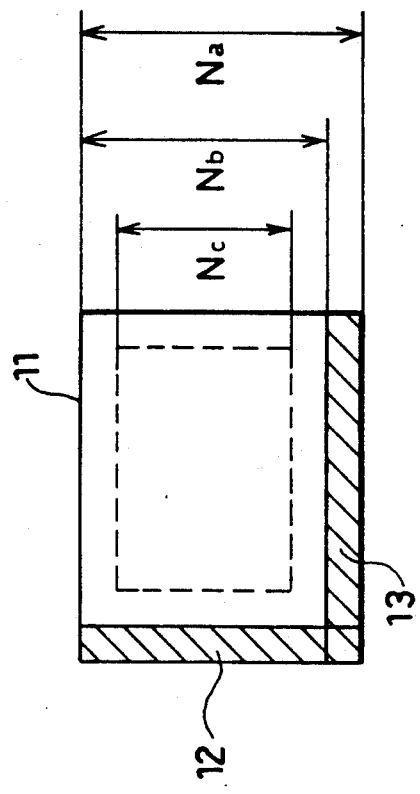
Figure 13:
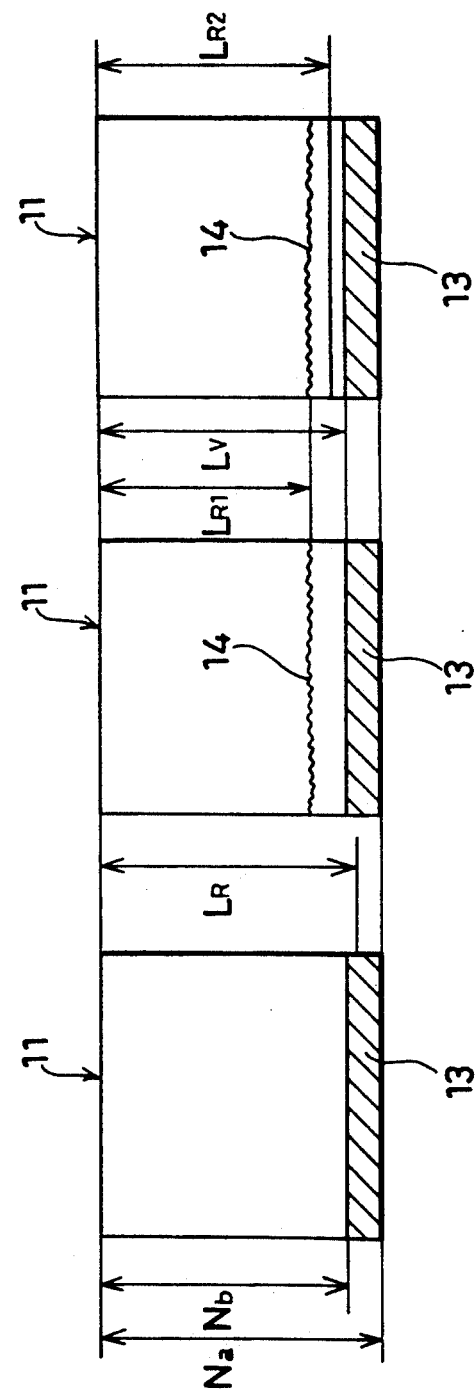
Figure 14:
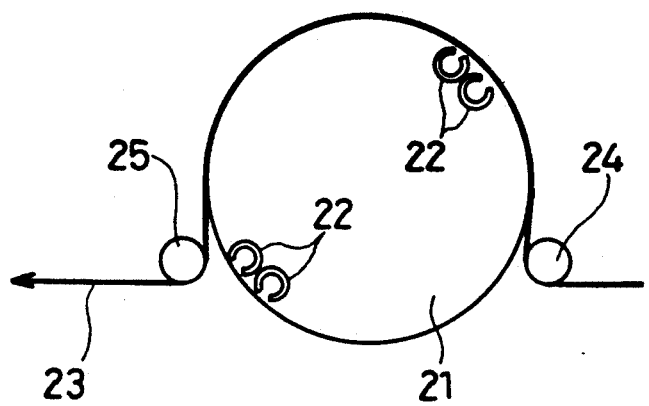
Figure 15:
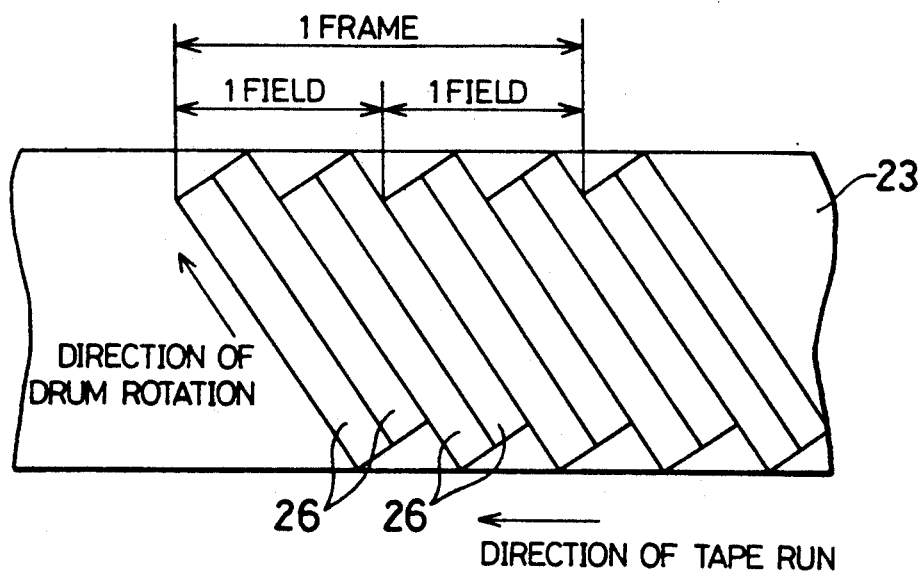
Figure 16:
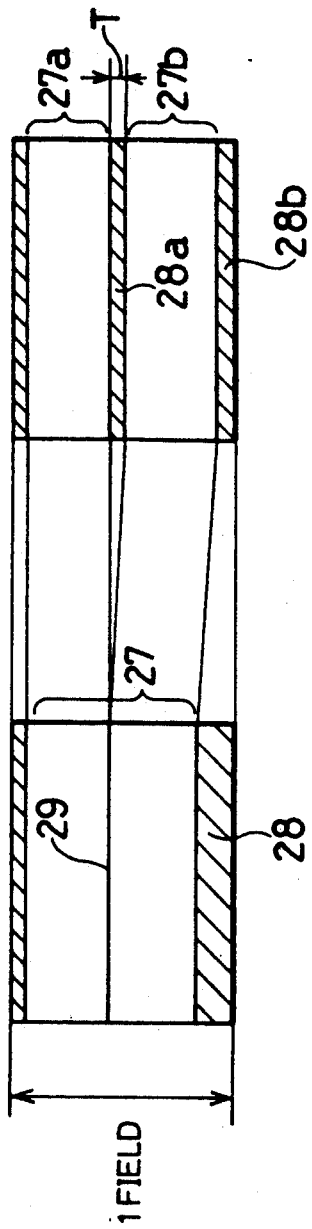
Figure 17B:
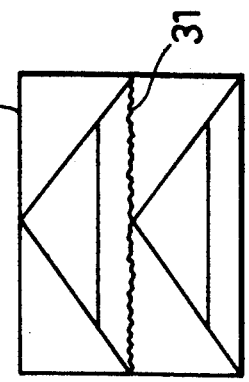
FIG. 17(b) is a front view showing a screen in a three-time speed reproduction.
Figure 17A:
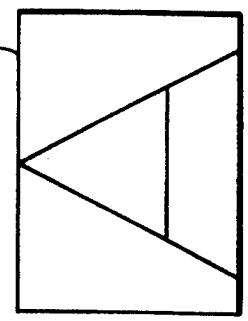
FIG. 17(a) is a front view showing a screen in a normal reproduction.

As shown in FIG. 12, when a screen 11 is expressed with the horizontal scanning period of a video signal shown in the x-axis, and the vertical scanning period of the same in the y-axis, the total number of the scanning lines is expressed as Na. Now, each part with slanting lines therein in the figure shows a vertical blanking period 12 as well as a horizontal blanking period 13. Accordingly, the number of lines for an effective image area is expressed as Nb, which is calculated by subtracting the number of lines for the vertical blanking part 13 from those for the screen 11.

Moreover, in an actual TV screen, over scanning of video signals is performed for a sufficient scanning. The number of lines for this overscanned image area Nc is therefore smaller than that for the effective image area Nb. Now, when the proportion of the overscanned image area to the effective image area is expressed as an overscanning rate K, the rate is shown as follows:

$$K = 1 - \frac{Nc}{Nb}$$

The above overscanning rate K is different depending on the respective TV receivers, but it is normally determined to be not more than 15%.

By the way, basically in video signal recording/reproducing devices, lines not less than Nb, those for the effective image area, are supposed to be recorded, and therefore it is necessary to satisfy the requirements of the following formula, where the number of the recording lines is expressed as $L_R$:

$$Nb \leq L_R$$

Then, the number of lines $L_{R1}$ as to the position where noise bars 14 appear due to the head switching from the main heads 2 to the auxiliary heads 3 is shown in the following formula(4), using the number of recording lines $L_R$, where an angle for wrapping a video tape onto a rotary drum is expressed as an effective tape wrap angle $\Theta_V$:

$$L_{R1} = L_R \times \frac{\Theta_V}{360°} \tag{4}$$

Moreover, defining the number of effective lines for recording signals corresponding to the effective image area as the number of TV image effective lines $L_V$, (Nb=$L_V$), and the maximum number of lines $L_{R2}$, which are actually effective on the screen when the above overscanning is taken into consideration, is shown by the following formula(5):

$$L_{R2} = L_V \times (1-K) \tag{25}$$

Then, in order to remove the noise bars 14, which appear due to the head switching from the main heads 2 to the auxiliary heads 3, from the screen, the number of lines $L_{R1}$ as to the position where noise bars 14 appear should be greater than the maximum number of lines $L_{R2}$ which is effective on the screen. So, by putting the above formulas (4) and (5) in $L_{R1} \geq L_{R2}$ which satisfies the above condition, the following formula can be obtained:

$$L_R \times \frac{\Theta_V}{360°} \geq L_V \times (1-K)$$

The condition of the effective tape wrap angle $\Theta_V$ is obtained as the following formula(6) from the above formula.

$$\Theta_V \geq (1-K) \times \frac{L_V}{L_R} \times 360° \tag{6}$$

For example, the total number of scanning lines Na which compose one frame of the screen is 1125 in HD-TV's, and the number of lines for an effective image area Nb(=the number of TV image effective lines $L_V$) is obtained as 1036 lines by subtracting those of a vertical blanking period from the above number. Now, it is supposed that in a video signal recording/reproducing device in the present embodiment, the number of recording lines $L_R$ is; 1050, according to the condition, $L_R \geq L_V$, and an overscanning rate for an actual screen is; 0.12, according to the condition, $K \leq 0.15$, and when these values are put in the above formula(6), it is found that an effective tape wrap angle of more than 312° is necessary.

In the video signal recording/reproducing device which has the above composition, line arrays on a video tape 4 and the relation between their line numbers and the screen are shown in FIGS. 8 to 11. The H alignment of these line arrays is shown as 1.5 H.

Figure 8A:
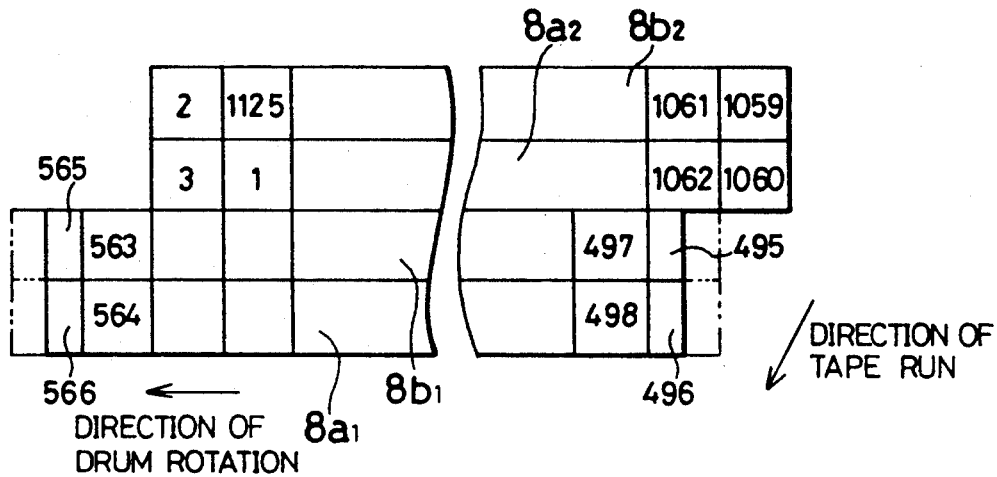
FIG. 8(a) is a diagram showing a line array of auxiliary tracks.
Figure 8B:
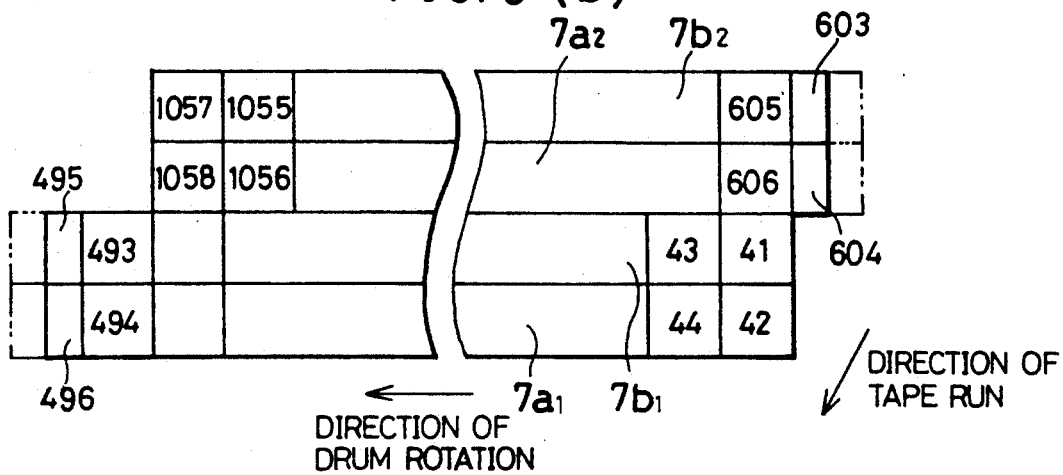
FIG. 8(b) is a diagram showing a line array of main tracks.

When an effective image area in baseband signals for HD-TV is shown using the line numbers, normally the first field corresponds to the 41st to 557th, and the second field corresponds to the 603rd to 1125th, and therefore they make 1035 lines all together. Now, if the number of recording lines $L_R$ is 1050 and recordings are started from the 41st, the first of the effective image area, two main tracks $7a_1$ and $7b_1$ are simultaneously formed by the main heads 2a and 2b in the first rotation of the rotary drum 1 as shown in FIG. 8(b), that is to say, the lines from 41st to 496th are recorded. However, as to the lines 495th and 496th, the recordings of 0.5 H portion are made. Next, as shown in FIG. 8(a), two auxiliary tracks $8a_1$ and $8b_1$ are simultaneously formed by the auxiliary heads 3a and 3b in the same rotation of the rotary drum 1, that is to say, the lines from the remaining 0.5 H portion of 495th and 496th to 566th are recorded, and therefore the recordings of one field portion is complete. However, as to the lines 565th and 566th, too, the recordings of 0.5 H portion are made.

Moreover, as is shown in FIG. 8(b), in the next one rotation of the rotary drum 1, at first two main tracks $7a_2$ and $7b_2$ are simultaneously formed by the main heads $2a$ and $2b$, thereby recording the lines from the remaining latter half 0.5 H portions of 603rd and 604th to 1058th. Next, as is shown FIG. 8(a), in the same one rotation of the rotary drum 1, two auxiliary tracks $8a_2$ and $8b_2$ are simultaneously formed by the auxiliary heads $3a$ and $3b$, thereby recording the lines from 1059th to 1125th as well as those from 1st to 3rd turning around to the first, and the recordings of one frame portion is complete.

Figure 9:
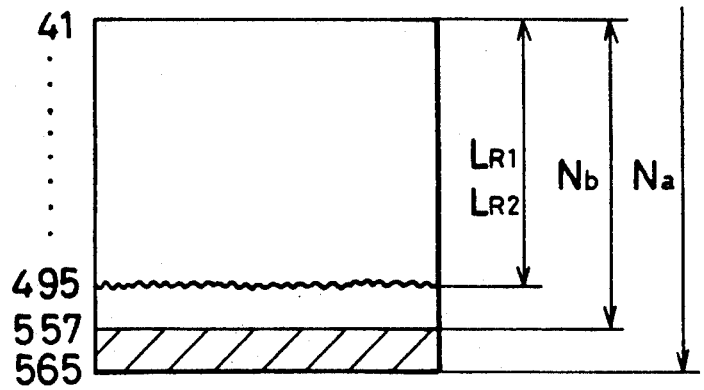

The line numbers in the above line array are shown in comparison with one field portion of the screen in FIG. 9. The number of lines for an effective image area, Nb, ranges from 41st to 557th within the total number of lines, Na, up to 565th. For example, if an effective tape wrap angle $\Theta_V$ is 312°, the number of lines recorded by the main heads 2, $L_{R1}$, is 455, as shown in the following, since the number of recording lines $L_R$ for one field portion is 525 which is half the above number, 1050.

$$525 \times \frac{312°}{360°} = 455$$

Accordingly, as is shown in FIG. 8(b), the line number 495th, which falls on the 455th when counting up from 41st, is the position of line where noise bars appear due to head switching from the main heads 2 to the auxiliary heads 3. Then, the number of lines, 455, from 41st to 495th conforms to the number of lines, $L_{R2}$, which is obtained by subtracting the overscanning rate K of 12% from the number of lines for an effective image area, Nb.

Consequently, if an effective tape wrap angle $\Theta_V$ is more than 312°, as shown in the above, the line of noise bars($L_{R1}$) can be removed downward from the lower end line($L_{r2}$) of an actual screen.

Figure 10A:
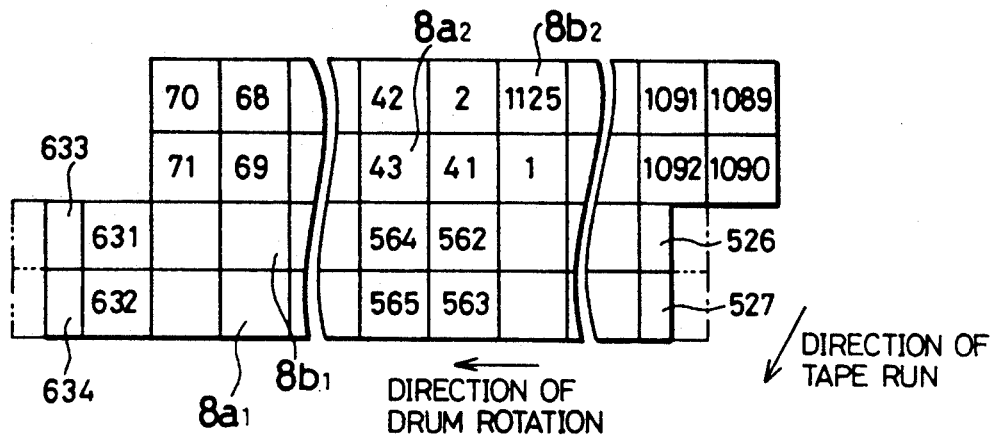
FIG. 10(a) is a diagram showing a line array of auxiliary tracks in the case that the center is conformed.
Figure 10B:
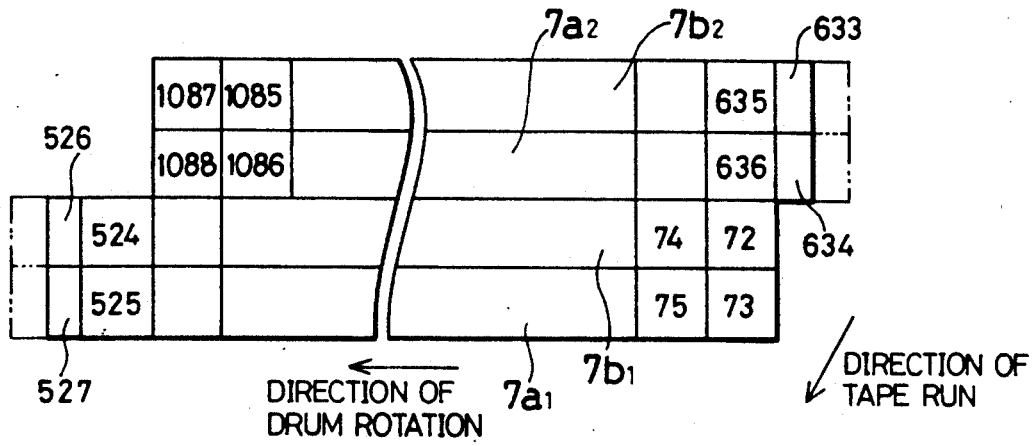
FIG. 10(b) is a diagram showing a line array of main tracks in the case that the center is conformed.
Figure 11:
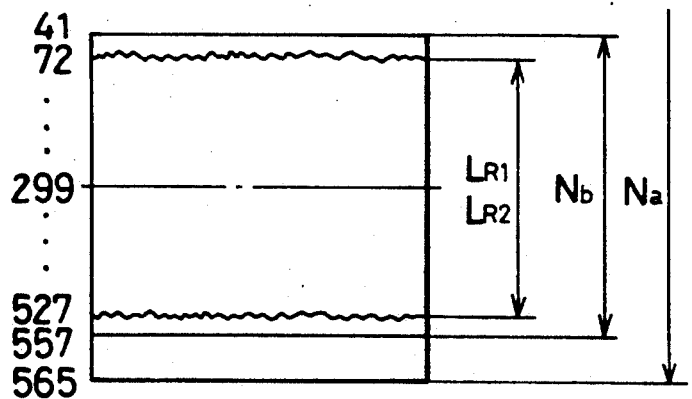

Next, another case is shown in FIGS. 10 and 11, wherein the recordings of the main tracks 7 are started in the 72nd, which is in the middle of the lines for an effective image area.

At first, as shown in FIG. 10(b), two main tracks $7a_1$ and $7b_1$ are simultaneously formed by the main heads $2a$ and $2b$ in the first rotation of the rotary drum 1, that is to say, the lines from 72nd to 527th are recorded. However, as to the lines 526th and 527th, the recordings of 0.5 H portion are made. Next, as shown in FIG. 10(a), two auxiliary tracks $8a_1$ and $8b$ are simultaneously formed by the auxiliary heads $3a$ and $3b$ in the same rotation of the rotary drum 1, that is to say, the lines from the remaining 0.5 H portion of 526th and 527th to 634th are recorded, and therefore the recordings of one field portion is complete. However, as to the lines 633th and 634th, too, the recordings of 0.5 H portion are made.

Moreover, as is shown in FIG. 10(b), in the next one rotation of the rotary drum 1, at first two main tracks $7a_2$ and $7b_2$ are simultaneously formed by the main heads $2a$ and $2b$, thereby recording the lines from the remaining latter half 0.5 H portion of 633rd and 634th to 1088th. Next, as is shown FIG. 10(a), in the same one rotation of the rotary drum 1, two auxiliary tracks $8a_2$ and $8b_2$ are simultaneously formed by the auxiliary heads $3a$ and $3b$, thereby recording the lines from 1089th to 1125th as well as those from 1st to 71st turning around to the first, and the recordings of one frame portion is complete.

The line numbers in the above line array ar shown in comparison with one field portion of the screen in FIG. 11. The number of lines for an effective image area, Nb, ranges from 41st to 557th within the total number of lines, Na, up to 565th. In this case, since recordings are started from the 72nd line, noise bars due to head switching between fields appear on the 72nd line. Moreover, if an effective tape wrap angle $\Theta_V$ is 312°, since the number of lines recorded by the main heads 2, $L_{R1}$, is 455, as is mentioned in the above, the 527th line, which falls on the 455th when counting up from 72nd, is the position of line where noise bars appear due to head switching from the main heads 2 to the auxiliary heads 3. Furthermore, the number of lines, 455, from 72nd to 527th conforms to the number of lines, $L_{R2}$, which is obtained by subtracting the overscanning rate K of 12% from the number of lines for an effective image area, Nb. Accordingly, the center of the 455 lines from the 72nd to 527th also conforms to the center of the lines for an effective image area(the number of lines for an effective image area is Nb) on the 299th line.

As a result, the center of an actual screen conforms to that of an effective image area which is considered to be the most important in general, and the upper and lower ends of the effective image area, which are considered to have less information, can be removed from the screen to the outsides of the upper and lower ends of the screen together with noise bars.

As is described above, a video signal recording/reproducing device according to the present invention has a composition wherein one of the above auxiliary heads is switched by the head switching device and the running speed of the tape is also switched by the tape speed switching device according to the video signals, and thereby the composition permits the video signal recording/reproducing device to record and reproduce both wide and narrow video signals by the use of only one device. Consequently, the present invention makes it possible to record and reproduce both video signals having a wide band and those having a narrow band using only one device, and the users can decide which band to choose depending on their wish for giving priority to high quality images or to longer recording time.

Another video signal recording/reproducing device according to the present invention, as described above, has a composition wherein the position of noise bars which appear when one segment is connected to another can be removed from an actual screen, wherein the overscanning is taken into consideration, to the outside thereof. Accordingly, even in a special reproduction, since the position of head switching does not appear within an actual screen, boarders in images are removed, and therefore noise bars are not produced.

The present invention is also characterized in comprising a signal processing means which records video signals on a video tape while conforming the center of the line numbers of main tracks, which are formed by main heads, to the center of the line numbers of TV image effective lines. Accordingly, noise bars produced by head switching together with image parts locating the upper and lower parts with less information amount can be removed by separating and locating them in the outsides of the upper and lower ends of the screen. Moreover, the center of images which is considered to be an important part can be conformed to the center of the screen.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A video signal recording/reproducing apparatus for helically recording video signals on a video tape, comprising:
    a rotary drum, having at least one group of magnetic heads including a main head and two auxiliary heads installed thereon, for guiding said magnetic heads along the video tape;
    band judgement means, coupled to input video signals to be recorded, for determining whether the input video signals are wide band signals or narrow band signals and for outputting a determination signal indicative thereof;
    head switching means for determining which of said two auxiliary heads is to be used in combination with said main head during video signal recording/reproducing by switching a first or a second of said two auxiliary heads into operation when said band judgement means determines that the input video signals are wide band signals or narrow band signals, respectively, in accordance with said determination signal; and
    tape speed switching means for switching video tape speed from low speed to high speed when said band judgement means determines that the input video signals are wide band signals and from high speed to low speed when said band judgement means determines that the input video signals are narrow band signals, in accordance with said determination signal.

2. A video signal recording/reproducing apparatus for helically recording video signals on a video tape, comprising:
    a rotary drum, having at least one group of magnetic heads including a main head and two auxiliary heads installed thereon, for guiding said magnetic heads along the video tape;
    signal processing means for processing input video signals for recording and detecting video signals from said magnetic heads;
    signal selection means, coupled to said signal processing means, for identifying whether said processed input video signals coupled thereto from said signal processing means are wide band signals or narrow band signals and for generating an identification signal indicative thereof;
    head switching means, coupled to said signal selection means, for determining which of said two auxiliary heads is to be used in combination with said main head by switching a first or a second of said two auxiliary heads into operation when said signal selection means determines that the input video signals are wide band signals or narrow band signals, respectively, according to said identification signal input from said signal selection means;
    head amplifier means for amplifying said processed input video signals sent from said signal processing means through said head switching means and said detected video signals sent from said main head and said switched auxiliary heads, said head amplifier means selecting the most appropriate current for amplification; and
    speed control means for controlling video tape speed according to said identification signal from said signal selection means.

3. The video signal recording/reproducing apparatus as defined in claim 1, wherein said first and second auxiliary heads comprise a first magnetic head and a second magnetic head, respectively, each of which has a magnetic gap with an azimuth angle of opposite orientation to that of said main head,
    two-channel guard bandless recordings being performed with video signals having a wide band by use of a combination of said main head and said first magnetic head, and
    one-channel guard bandless recordings being performed with video signals having a narrow band by use of a combination of said main head and said second magnetic head.

4. The video signal recording/reproducing apparatus as defined in claim 1 or 2, wherein said first and second auxiliary heads comprise a first magnetic head and a second magnetic head, said second magnetic head having an azimuth angle equal either that of said main head or said first magnetic head.

5. The video signal recording/reproducing apparatus as defined in claim 3 or 1, wherein said first magnetic head is located in such a position that recording tracks formed by said first magnetic head are formed adjacent to recording tracks formed by said main head on the video tape in a same one rotation of said rotary drum.

6. The video signal recording/reproducing apparatus as defined in claim 5, wherein said second magnetic head is located in such a position that during a next rotation of said rotary drum, recording tracks are formed adjacent to those formed by said main head on the video tape during said one rotation of said rotary drum.

7. The video signal recording/reproducing apparatus as defined in claim 3 or 1, wherein said main head and said two auxiliary heads are integrated into one structure.

8. The video signal recording/reproducing apparatus as defined in claim 2 or 3, wherein the input video signals having a wide band are defined as baseband signals and the input video signals having a narrow band are defined as MUSE signals.

9. The video signal recording/reproducing apparatus as defined in claim 1 or 2, wherein the video tape comprises a main track area formed by said main head and an auxiliary track area formed by said two auxiliary heads, track lead angles of said main track and auxiliary track areas being the same.

10. The video signal recording/reproducing apparatus as defined in claim 2, wherein said first and second auxiliary heads comprise first and second magnetic heads, respectively, each of which has a magnetic gap with an azimuth angle of opposite orientation to that of said main head,
    two-channel guard bandless recordings being performed with said wide band video signals by use of a combination of said main head and said first magnetic head, and
    one-channel guard bandless recordings being performed with said narrow band video signals by use of a combination of said main head and said second magnetic head.

11. The video signal recording/reproducing apparatus as defined in claim 5, wherein said first magnetic head is located in such a position that recording tracks formed by said first magnetic head are formed adjacent to recording tracks formed by said main head on the video tape in a same one rotation of said rotary drum.

12. The video signal recording/reproducing apparatus as defined in claim 11, wherein said second magnetic head is located in such a position that during a next rotation of said rotary drum, recording tracks are formed adjacent to those formed by said main head on the video tape during said one rotation of said rotary drum.

13. The video signal recording/reproducing apparatus as defined in claim 4, wherein said main head and said two auxiliary heads are integrated into one structure.

14. The video signal recording/reproducing apparatus as defined in claim 1, wherein the input video signals having a wide band are defined as base band signals and the input video signals having a narrow band are defined as MUSE signals.

15. A method of helically recording narrow band and wide band input video signals on video tape, using a video signal recording/reproducing apparatus including a rotary drum with at least one group of magnetic heads installed thereon, including a main head and two auxiliary heads, the rotary drum guiding the magnetic heads along the video tape, the method comprising the steps of:

determining, in band judgement means, whether the input video signals are wide band signals or narrow band signals;

switching a first of the auxiliary heads into operation with the main head, using head switching means, when the input video signals are determined to be wide band signals during said determining step;

switching a second of the auxiliary heads into operation with the main head, using the head switching means, when the input video signals are determined to be narrow band signals during said determining step;

running the video tape at a low speed when the input video signals are determined to be wide band signals during said determining step, under direction of speed control means; and running the video tape at a high speed when the input video signals are determined to be narrow band signals during said determining step, under direction of the speed control means.

* * * * *